Feb. 25, 1930.     O. TARDIF ET AL     1,748,906
LATH MACHINE
Filed March 14, 1927     9 Sheets-Sheet 9

Inventor
Omeril Tardif
Lucien Carrier
By Marion & Marion
Attorney

Patented Feb. 25, 1930

1,748,906

UNITED STATES PATENT OFFICE

OMERIL TARDIF AND LUCIEN CARRIER, OF PLESSISVILLE, QUEBEC, CANADA, ASSIGNORS TO LA FONDERIE DE PLESSISVILLE, OF PLESSISVILLE, CANADA

LATH MACHINE

Application filed March 14, 1927. Serial No. 175,306.

The present invention relates to improvements in lath machines and has for its primary object to provide a machine of this character designed to employ relatively thin saws producing a maximum number of laths from the lumber.

A further object of the invention is to provide a machine embodying cutting saws arranged in vertically offset positions so that each saw cuts a fractional portion of the bolt.

A still further object of the invention is the provision of a lath machine embodying means for adjusting the saws simultaneously to compensate for the wear thereof.

Another object of the invention is the provision of a lath machine designed to permit independent adjustment of one set of saws with respect to the complementary set.

Another object is the provision of a lath machine equipped with feed rollers which may be adjusted for engagement with the bolt or to a position out of contact therewith for removal of the bolt at any time.

A still further object of the invention resides in the provision of a lath machine equipped with arbor bearings designed to maintain the arbors in proper operative position and permit proper lubrication thereof.

Still another object of the invention resides in the provision of a lath machine constructed so as to eliminate vibration and which is designed to accurately and economically cut a plurality of laths from a bolt of lumber.

Other objects and advantages of the invention will become apparent as the description progresses.

In the accompanying drawings forming a part of this specification and in which like reference characters are employed to designate corresponding parts throughout the same.

Referring to the drawings, the numeral 30 designates the main support frame of the machine embodying a pair of side skeleton standards 31 of durable construction designed to firmly support the movable structure of the machine. These standards are rigidly braced in upright spaced parallel positions by a pair of rectangular relatively wide brace plates 32 attached to the intermediate vertical edges of the standards at each end and formed with an angular flange at the upper longitudinal edge resting on shoulders formed on the standards. The upper ends of the frame standards are held in position by comparatively narrow cross pieces 33 bolted or otherwise attached to the interior flanges of the standards.

Figures 15, 16, 17:
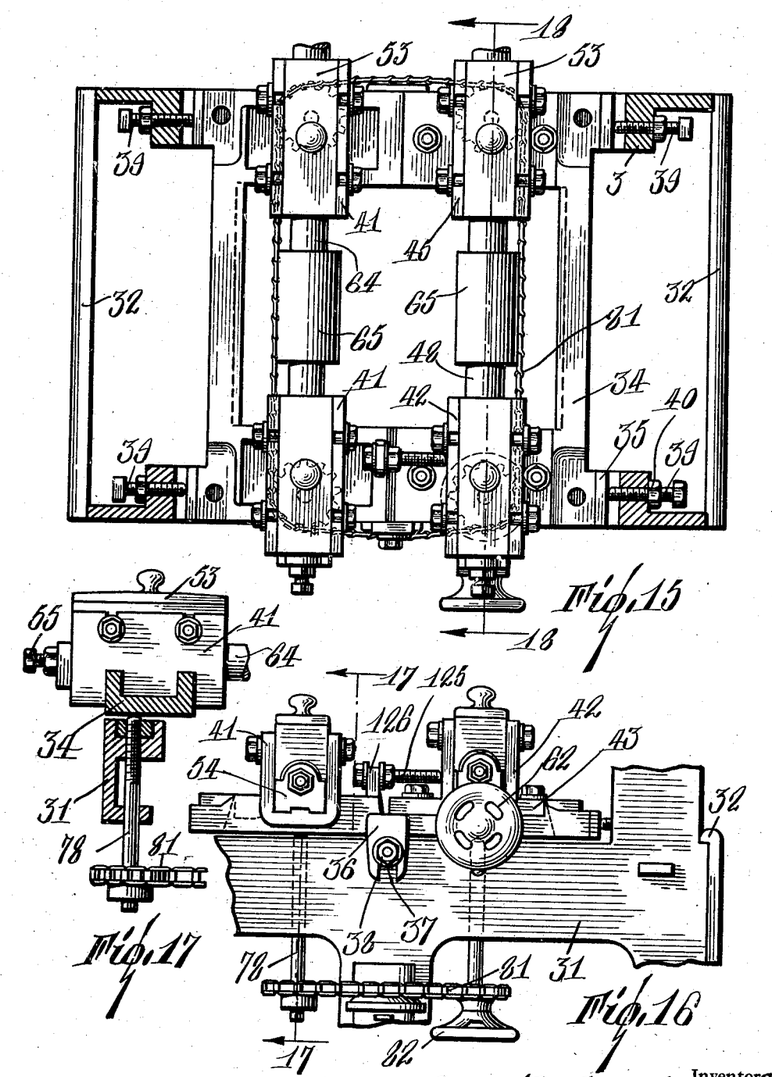
Figure 15 is a horizontal sectional view taken through the upper portion of the machine and looking downwardly.
Figure 16 is a fragmentary side elevational view illustrating the saw arbor adjusting mechanism.
Figure 17 is a vertical sectional view taken on the line 17—17 of Figure 16.

Resting in a horizontal position in the intermediate portion of the main support frame and having its side edges supported upon the interior horizontal flanges of the standards is a rectangular shaped auxiliary frame 34 recessed at its centre to lighten the structure. This frame is provided at its corners with vertical flanges 35 normally spaced from the vertical end portions of the standards. Formed integral with the side edges of the auxiliary frame 34 on the intermediate portions are downwardly extending ears 36 overhanging the outer sides of the standards to prevent great longitudinal displacement of the frame. The lower ends of the ears 36 are formed with vertical slots 37 engageable with threaded bolts extending through the sides of the standards. Securing nuts 38 are threaded on the outer ends of the bolts for detachably tightening the ears to maintain the auxiliary frame is locked position. As clearly indicated in Figures 4 and 15 of the drawings, four bolts 39 are threaded laterally through the vertical upper flanges of the standards in alinement with the flanges 35 of the auxiliary frame. The bolts 39 are secured in adjusted position by means of lock nuts 40 threaded on the bolts to lock the same in predetermined positions. From this structure it is apparent that the auxiliary frame may be laterally shifted on the main frame standards a distance corresponding to the width of slots 37, by threaded adjustment of the bolts 39. The essential feature of the auxiliary frame is to provide an adjustable support for the saw arbor bearings which are arranged to extend laterally of the support frame. One pair of bearings 41 are solidly secured to the auxiliary frame in alined positions embodying U-shaped bearing housings formed integral with the side extensions of the auxiliary frame or rigidly secured thereon to support a stationary saw arbor in horizontal operative position. Mounted in parallel position with the rear bearing housing 41 is a complementary housing 42 also of U-shaped formation provided with horizontal side flanges 43 arranged for longitudinal and lateral sliding movement in a recess formed on the side of the frame. A pair of vertical bolts 44 extend through openings in the sides of the auxiliary frame and through enlarged registering apertures in the side flanges of the bearing housing to permit slight movement of the adjustable bearing. A detachable bearing housing 45 is secured on the forward portion of the auxiliary frame 34 and is arranged in transverse alinement with the rear adjustable housing 42. This bearing is also mounted like the housing 42 so as to permit slight adjustment on the frame to correspond with any lateral adjustment of the rear bearing 42. In this connection attention is invited to the fact that the operating side of the machine will be called, for the purpose of convenience, the forward side and the other the rear side.

Each of the bearings 41, 42 and 45 forming the saw arbor bearings embodies a rectangular shaped housing open at the top and formed with upwardly tapering inside walls. The upper edges of the longitudinal side walls of the housings are formed with vertical slots 46 the purpose of which will be hereinafter described. Removably fitted in the bottom of the housings are rectangular bottom bearings 47 recessed to receive one end of the saw arbors 48 and 64. As clearly indicated in Figure 18, the rear end of each arbor 48 is formed with a series of annular tapered grooves 49 engaging corresponding collars formed in the bearings 47. A pair of spaced upper bearing sections 50 are arranged in the housings and engage the upper portion of the arbor, these sections preferably tapering in transverse cross section and carrying laterally projecting threaded shanks 51 engageable with the vertical slots 46 formed in the upper edges of the housing. Mounted on the outer threaded ends of the shanks 51 are nuts 52 arranged to lock the bearing sections 50 in position on the arbor. In practice, the upper chamber of the bearing housing is filled with lubricant and enclosed by a removable cover 53. The housings 41 and 42 are provided with a plate 54 formed with a screw threaded opening through which is threaded a set screw 55 adapted to bear against the rear end of the stationary saw arbor to take up any play in the bearing. With particular reference to the adjustable bearing housing 42, an offset downwardly projecting tongue 56 is formed on the lower end of the plate 54 offset rearwardly to clear the base of the housing. This projection is provided to permit axial movement of the adjustable arbor shaft whereby the saw sets can be maintained in alinement.

The axial adjustment of the housing 42 is accomplished by means of a longitudinal screw threaded shank 57 horizontally movable in a circular bore 58 formed in the rear edge of the auxiliary frame immediately below the longitudinal centre of the housing. The shank threadedly engages a fixed nut 59 embedded in a rearwardly projecting pocket 60 formed integral with the frame. The rear end of the shank 57 is formed with a reduced extension on which is secured a circular collar 61 rotatable in a recess formed in the lower end of the tongue 56. The rear end of the shank 57 is extended through openings in the tongue at each side of the recess. Fixed upon the rear projecting end of the shank 57 and spaced from the rear end of the tongue 56 is a hand wheel 62 by means of which the shank is rotated. Threadedly mounted on the rear portion of the shaft between the forward hub of the hand wheel and the rear side of the tongue 56 is a lock nut 63 formed with a radially projecting handle for convenient operation thereof. From the foregoing construction it will be readily noted that rotary operation of the hand wheel and shaft will cause axial movement of the bearing housing 42 and the adjustable saw arbor 48 to vary the horizontal position thereof.

Figure 1:
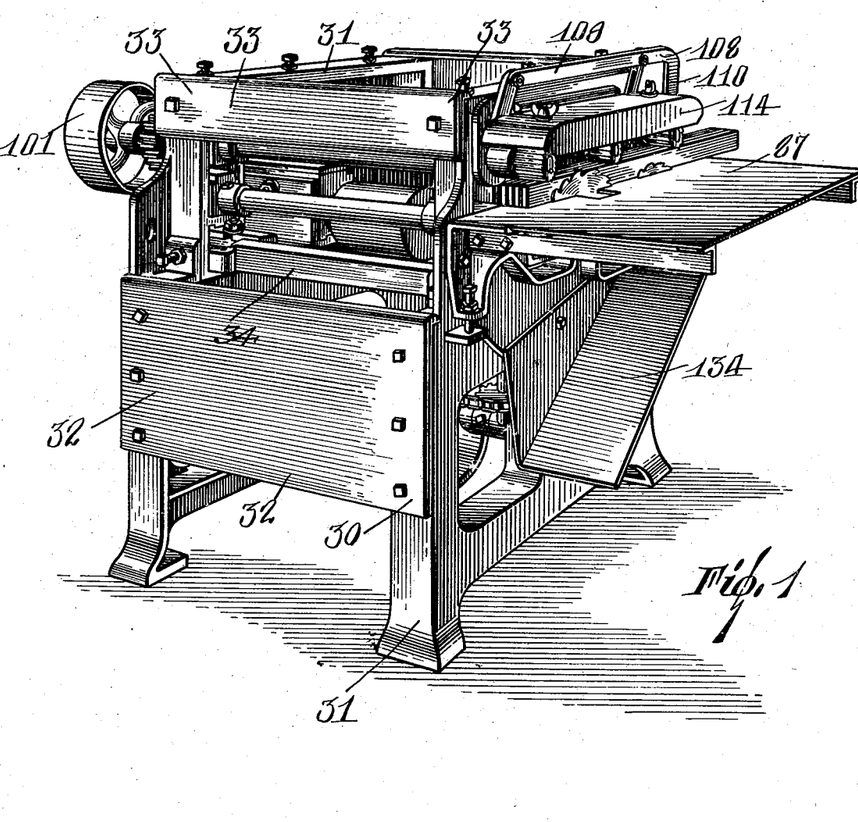
Figure 1 is a perspective view of the assembled machine constructed in accordance with our invention.
Figure 2:
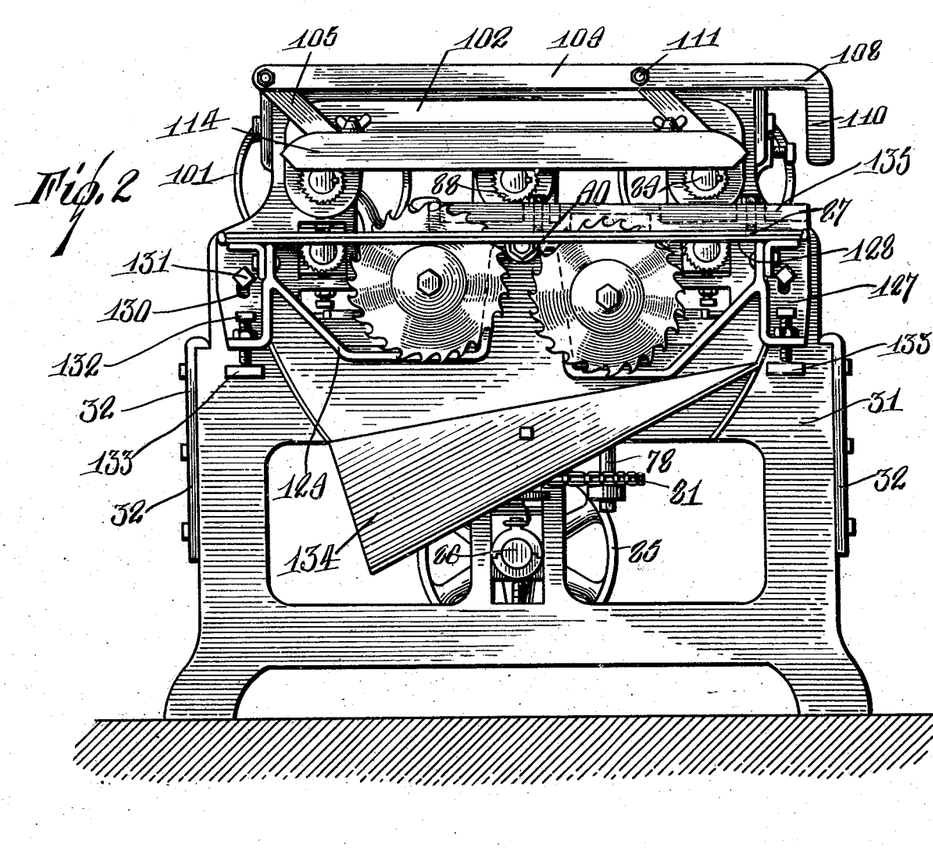
Figure 2 is a side elevational view taken from the operating side.
Figure 3:
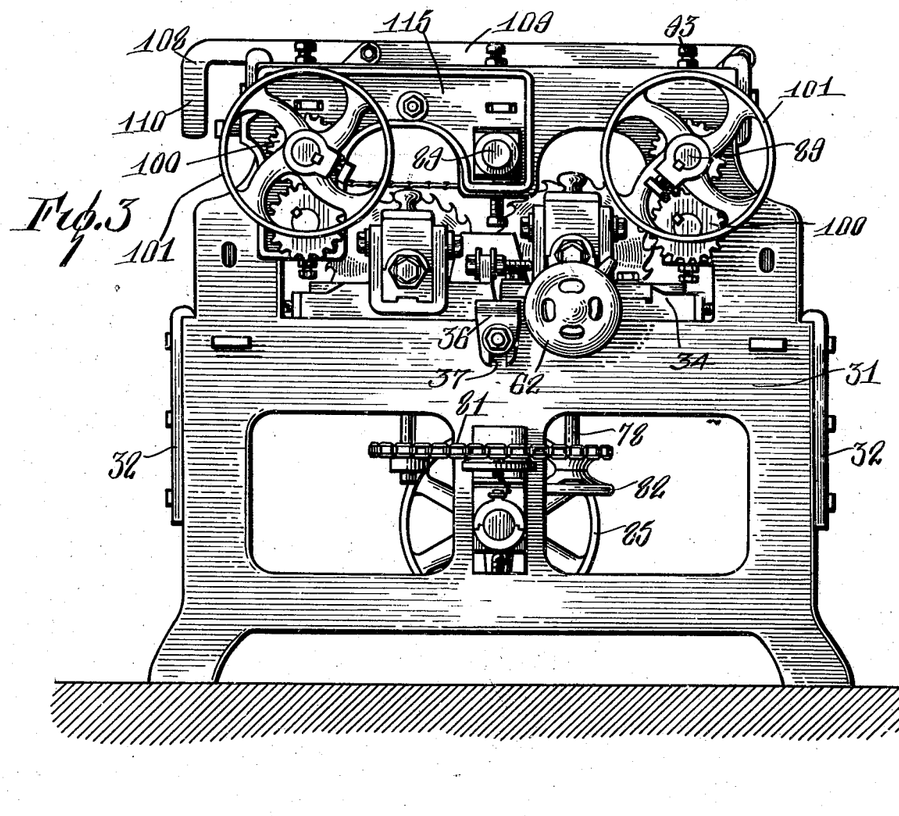
Figure 3 is a similar view taken from the opposite side of the machine.
Figure 4:
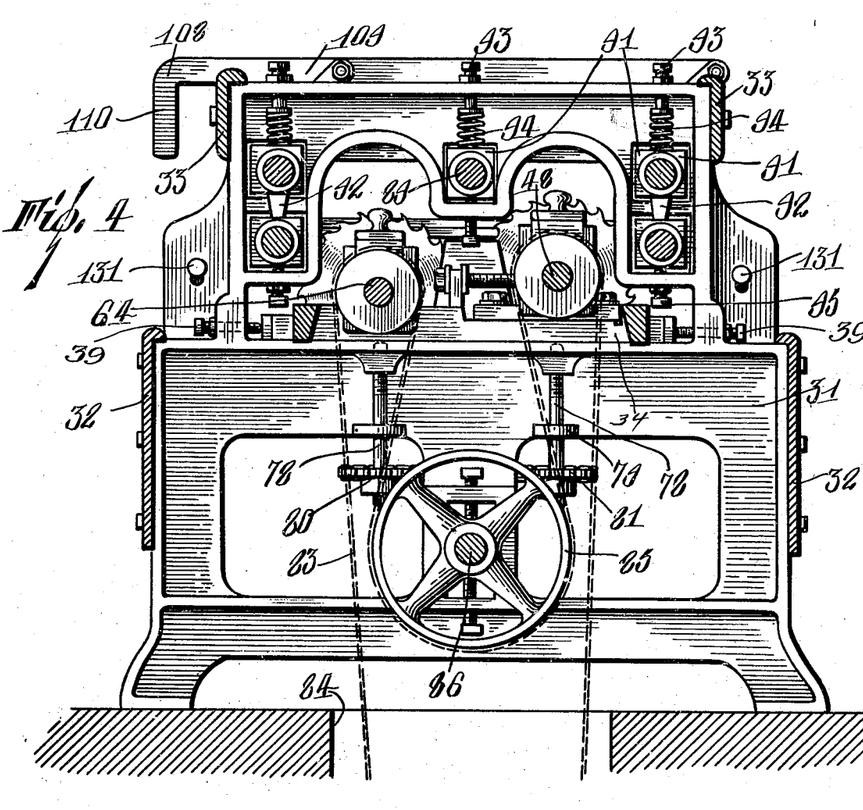
Figure 4 is a vertical longitudinal sectional view taken through the intermediate portion of the machine.
Figures 18, 19, 20, 21:
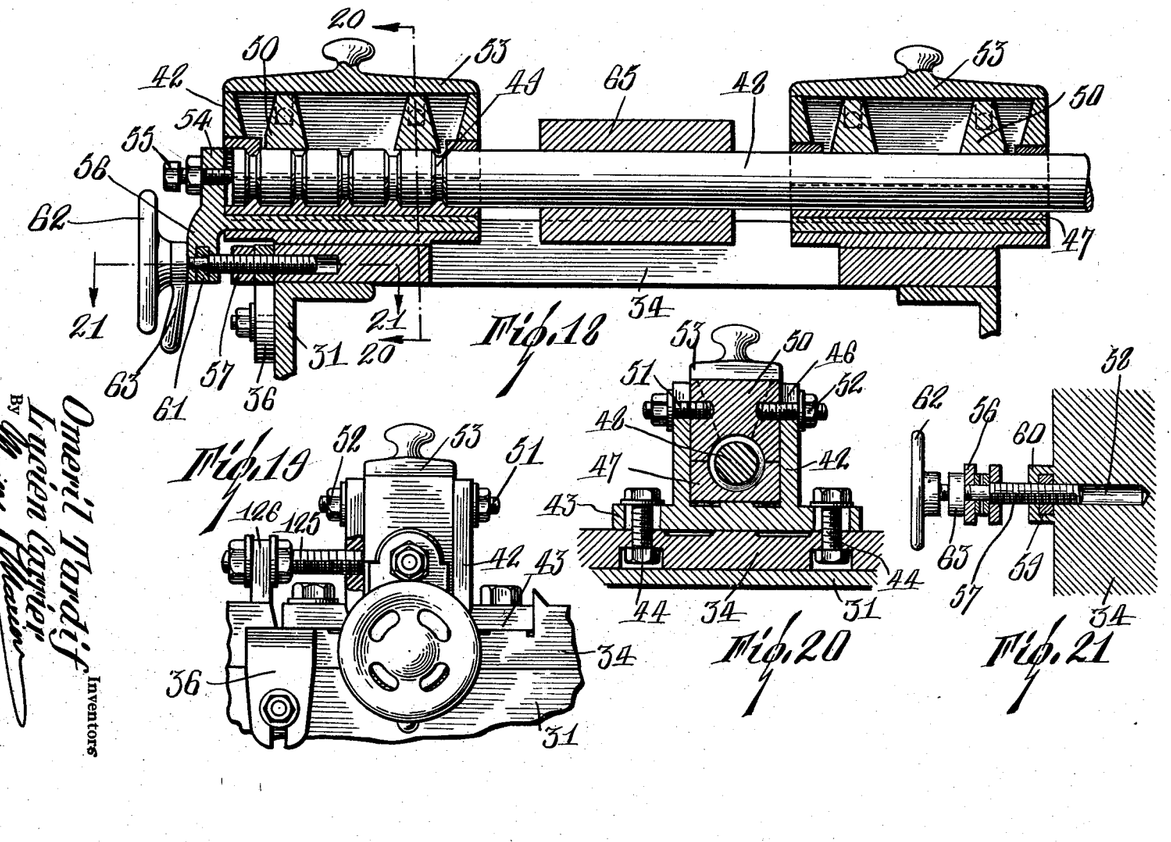
Figure 18 is an enlarged vertical sectional view taken on the line 18—18 of Figure 15.
Figure 19 is an enlarged fragmentary side elevational view of the saw arbor adjusting structure.
Figure 20 is a vertical sectional view taken on the line 20—20 of Figure 18.
Figure 21 is a horizontal sectional view taken on the line 21—21 of Figure 18.

From the illustration disclosed in Figures 4 and 18 it will be noted that the bearing housings 42 and 45 rotatably support the adjustable arbor 48 and are arranged in vertically elevated positions with respect to the parallel housings 41 which support a stationary arbor 64. The forward ends of the arbors 48 and 64 carry circular lath saws rigidly fixed on the shafts and accurately spaced by means of spacing collars. Each shaft preferably carries a set of three saws arranged to aline in a vertical plane. All of the saws are of equal exterior diameter so that the upper cutting periphery of the set initially cutting the lath will be arranged in a substantially lower position than the corresponding cutting edges of the next set so that the first saws will cut through a portion of the lath bolt and the succeeding saws the remaining portion.

Figure 22:
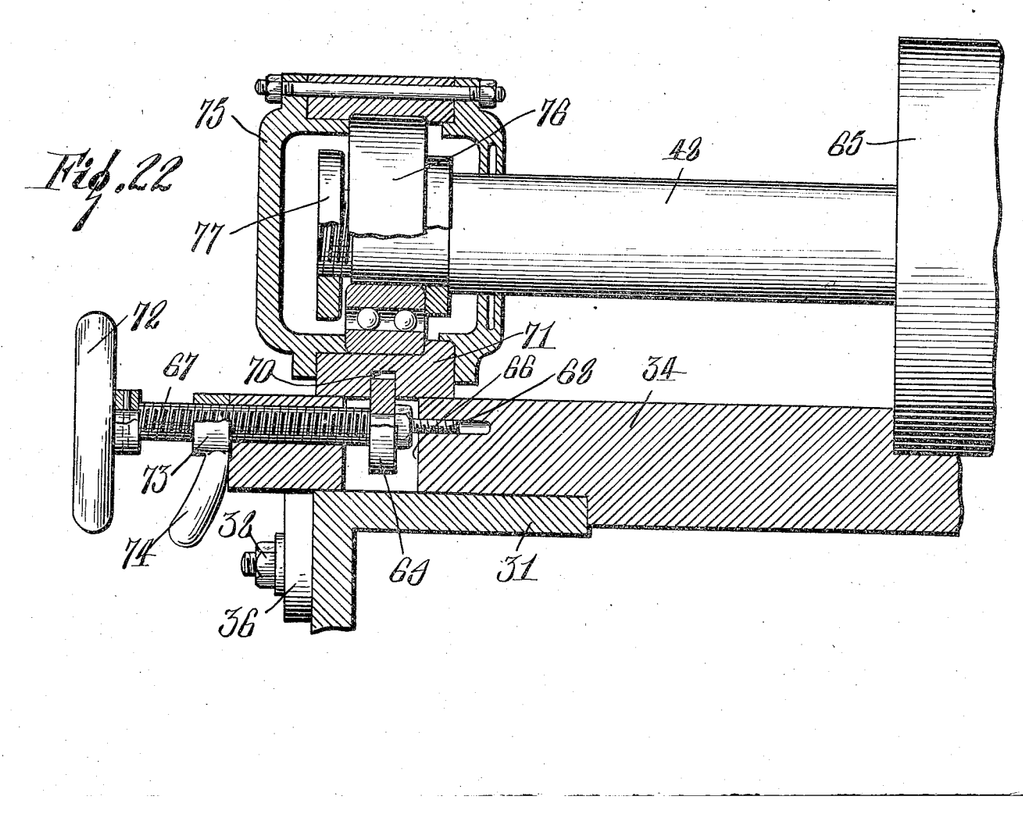
Figure 22 is an enlarged vertical section showing a modified form of arbor adjusting mechanism adapted for a ball type of arbor bearing.

Fixed on the intermediate portions of the saw arbors 48 and 64 and spaced between the bearings are cylindrical pulleys 65 engageable with a suitable drive belt for simultaneous rotary operation of the arbors. From this construction it will be readily apparent that the saw arbors 48 and 64 may be accurately maintained in parallel operating position so that the lath saws will be maintained in alinement to properly cut the bolt.

Where a ball bearing structure is employed to support the rotary saw arbors, as shown in Figure 22, a modified form of adjusting mechanism is provided, the auxiliary bearing frame being formed with a recess 66 adjacent its rear edge. A threaded shaft 67 is threadedly mounted in horizontal position through the rear portion of the auxiliary frame, its inner end terminating in a reduced extension 68 rotatably mounted in a bore formed in the frame. An annular disc 69 is secured on the inner portion of the shaft 67 and is movable within the limits of the recess 66 in the frame. The disc 69 projects above the upper surface of the frame and engages a recess 70 formed in the lower base plate 71 of the roller bearing housing so that threaded operation of the shaft 67 will axially adjust the position of the bearing housing. Fixed on the rear end of the shaft 67 and adapted to rotatably actuate the same is a hand wheel 72 of relatively large diameter to permit convenient adjustment of the bearings. The shaft may be locked in position by a threaded sleeve 73 threaded and mounted on the rear portion of the shaft operable by a handle 74. In this form of bearing, the housing designated by the numeral 75 is reduced in length and the rear end of the arbor 48 is mounted in a roller bearing structure 76, a threaded flange 77 being positioned on the rear extremity of the arbor to prevent axial displacement.

In order to compensate for the wear of the saws, mechanism is provided for vertically adjusting the position of the horizontal auxiliary bearing frame 34 without affecting the alinement of the arbors. This mechanism embodies four vertically arranged shafts 78 exteriorly screw threaded for threaded engagement with horizontal ears 79 formed on the inner sides of the main frame standards, each of the shafts 78 being substantially in vertical alinement with the longitudinal centre of the saw arbors and adjustable through openings in the horizontal intermediate flanges of the frame standards. Fixed adjacent the lower end of each of the shafts 78 and arranged in a horizontal plane are sprocket wheels 80 about which is trained a continuous chain 81. Secured on the lower end of one of the rear shafts 78 for rotary operation thereof is a hand wheel 82 adapted to simultaneously operate the four shafts 78 for vertical adjustment of the auxiliary bearing frame 34 in a level horizontal position.

As shown to advantage in Figure 4, the saw arbors are driven by a unitary continuous belt shown at 83, this belt being trained over a suitable drive pulley carried by an electric motor or other source of power positioned in a pit 84 of the machine shop floor, over the pulleys 65 of the saw arbors and trained about a relatively large idler pulley 85 supported in the lower central portion of the frame. The pulley 85 is mounted on a shaft 86 the ends of which are adjustably supported on the inner sides of the main frame standards so that the pulley 85 can be vertically adjusted to tighten the drive belt 83.

Figures 6, 7, 8:
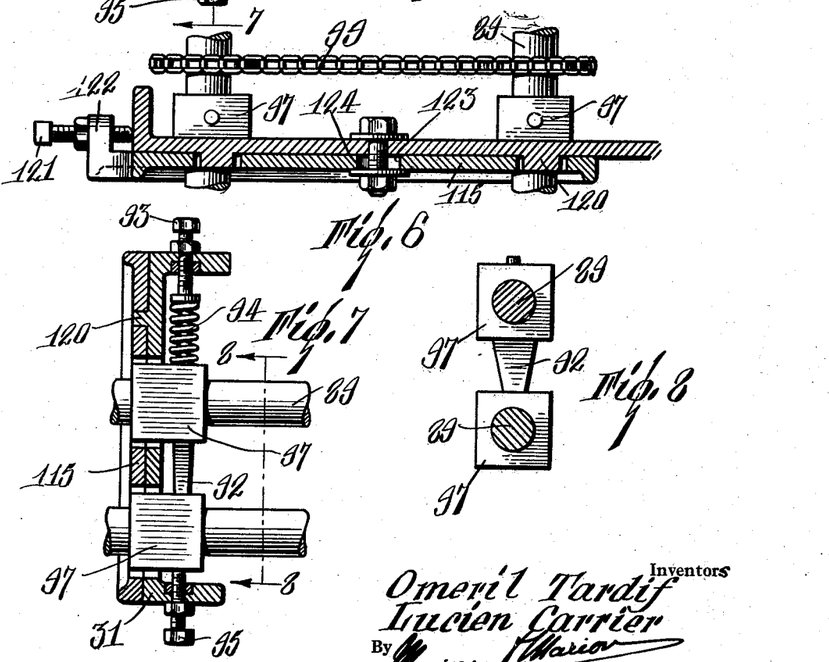
Figure 6 is a horizontal sectional view taken on the line 6—6 of Figure 5.
Figure 7 is a vertical transverse sectional view taken on the line 7—7 of Figure 5.
Figure 8 is a vertical sectional view taken on the line 8—8 of Figure 7.
Figure 9:
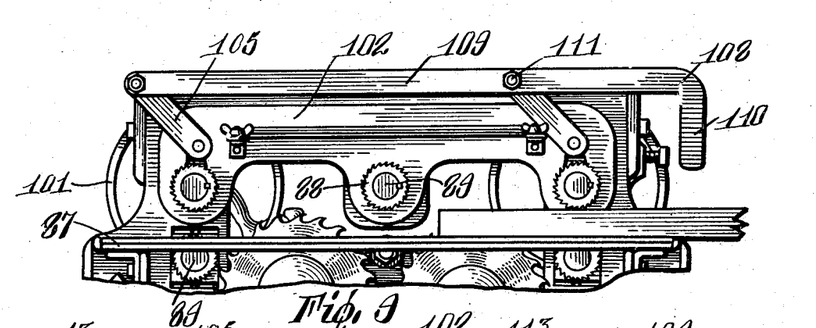
Figure 9 is a fragmentary side elevational view of the machine showing the roller adjusting structure in normal operating position.

The bolt of lumber from which the laths are cut is accurately fed upon a horizontal table 87 and in engagement with the saws by a plurality of feed rollers 88 keyed upon the forward ends of roller arbors 89. In the present embodiment of the machine five live rollers are provided, three arranged in horizontal alinement above the table and two below, a dead roller 90 being mounted between the lower live rollers to support the bolt during its passage on the table. The five driven rollers are formed with angular spurs on the outer periphery for positive engagement with the lath bolt to ensure its steady forward movement. The forward ends of the roller arbors 89 are journaled in rectangular shaped bearings 91 mounted in vertically elongated rectangular recesses formed in the upper portion of the front frame standard, the recesses being of greater vertical extension than the bearings to permit vertical adjustment of the bearings. The upper end bearings 91 are formed with tapered downwardly projecting lugs 92 arranged to contact with the upper edge of the lower end bearings to properly maintain the end roller bearings in spaced position. Bolts 93 are threadedly mounted through the upper horizontal flange of the forward frame standard immediately above the roller arbors, coiled compression springs 94 being secured to the lower ends of the bolts 93 pressing downwardly on the centres of the upper arbor bearings 91. The lower end bearings rest on adjustable set screws 95 extending through flanges in the standard. In this manner, the forward roller arbor bearings are resiliently maintained in proper operative positions. Formed integral with the front bearings 91 and projecting forwardly through the main frame of the machine are cylindrical collars 96 adapted to space the rollers from the frame. The rear ends of the roller arbors 89 are supported in rectangular shaped bearings 97 extending through enlarged recesses formed in the rear frame standard. These bearings are also resiliently held in position and separated by spacing lugs 92. As indicated in Figure 6, a pair of vertically alined sprockets 98 are firmly attached on the roller arbors 89 adjacent their rear ends, these sprockets being fixed upon one of the upper end arbors and the upper intermediate arbor so that the intermediate arbor will be driven simultaneously with the end arbor through the medium of a chain 99 trained over the sprockets. Keyed or otherwise secured upon the rear end portions of the upper and lower end roller arbors 89 are vertically alined spur gears 100 meshing directly so that the upper and lower arbors are respectively rotated in reverse directions. Secured to the upper end arbors and keyed to rearward projections formed thereon are a pair of pulleys 101 adapted to be driven by a suitable drive belt from a source of power independent of the operation of the saws or simultaneously therewith. With this construction, the spurred feed rollers 88 will be positively driven to actuate the lumber through the saws in the manufacture of laths.

In order to accurately feed the bolts through the saws, the arbors of the feed rollers initially engaging the bolt are arranged at horizontal angular positions so as to feed the bolt inwardly against a guide member as well as longitudinally on the table 87. In the present embodiment it is contemplated to arrange the arbors of the first two upper rollers and the first lower roller in angular position with respect to the axial extension of the remaining roller arbors and the saw arbors as will be hereinafter described.

Figures 11, 12, 13, 14:
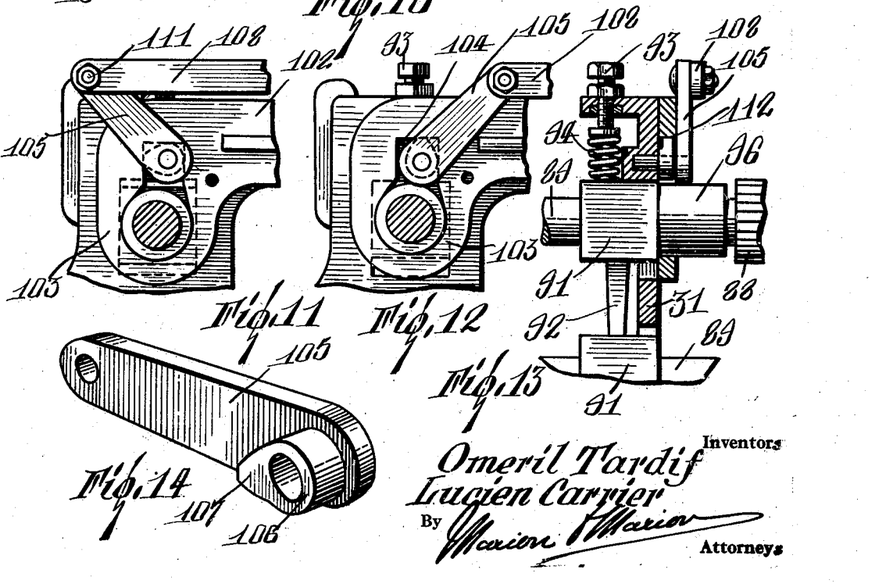
Figure 11 is an enlarged fragmentary elevational view of the adjusting mechanism with the roller arbors in operating position.
Figure 12 is a similar view showing the arbors in elevated releasing position.
Figure 13 is an enlarged vertical sectional view taken on the line 13—13 of Figure 10.
Figure 14 is a perspective view of the roller arbor elevating crank.

In order that the upper feed rollers may be quickly moved out of engagement with the bolt for removal thereof, we provide mechanism for manually elevating the forward roller arbor bearings out of contact with the bolt, this structure including a longitudinal support plate 102 formed at the ends and intermediate portion with laterally projecting ears 103. The plate 102 and ears 103 are arranged in vertical position against the forward frame standard and supported for vertical adjustment thereon. The ears 103 are formed with circular openings through which the bearing collars 96 are extended, the end ears being formed with upwardly projecting rectangular slots 104 communicating with the circular openings. Pivotally connected with the front frame standard and arranged to swing in a vertical arc are a pair of complementary levers 105 formed with a cam 106 embodying a concentric circular body formed with a tapered extension 107 terminating in a flat end portion. The cam 106 is formed to rotate in the slot 104 of the bearing support plate, normally assuming a horizontal position in the slot when the lever 105 is directed in an angular position away from the operating end of the frame as clearly shown in Figure 11. When the lever assumes an angular position directed toward the operating end of the frame and has moved through an angle of approximately 90°, the tapered projection 107 of the cam member is disposed in a vertical upwardly directed position as shown in Figure 12 thereby elevating the bearing support plate 102 and the forward end of the roller arbors. An angular arm 108 embodying a longitudinal extension 109 and a right angular handle portion 110 is connected with the levers 105, the upper ends of the levers being pivotally connected with the horizontal arm extension 109 by means of pivot pins 111. The lower ends of the levers 105 are connected with the frame standard by means of pivot pins 112 connected with the lower end of the lever and pivotally mounted in openings formed in the standard. From this description it would be readily seen that the arm extension 109 is arranged in a horizontal position while the handle 110 depends downwardly in a vertical position at the operating end of the machine. Thus, the operator can readily shift the arm 108 longitudinally to actuate the bearing plate 102 and release the upper spurred feed rollers from the lath bolt.

Figure 10:
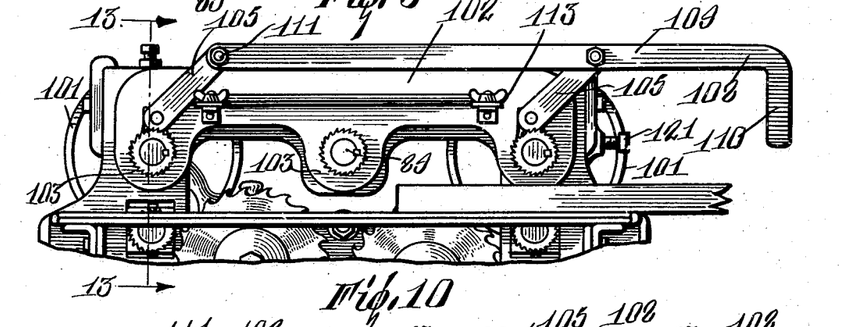
Figure 10 is a similar view showing the roller adjusting structure in bolt releasing position.

With reference to Figure 10, it will be noted that a pair of angular brackets 113 are attached to the outer side of the plate 102 adjacent its ends for supporting a horizontal hood 114 extending laterally of the machine and covering the upper feed rollers.

Figure 5:
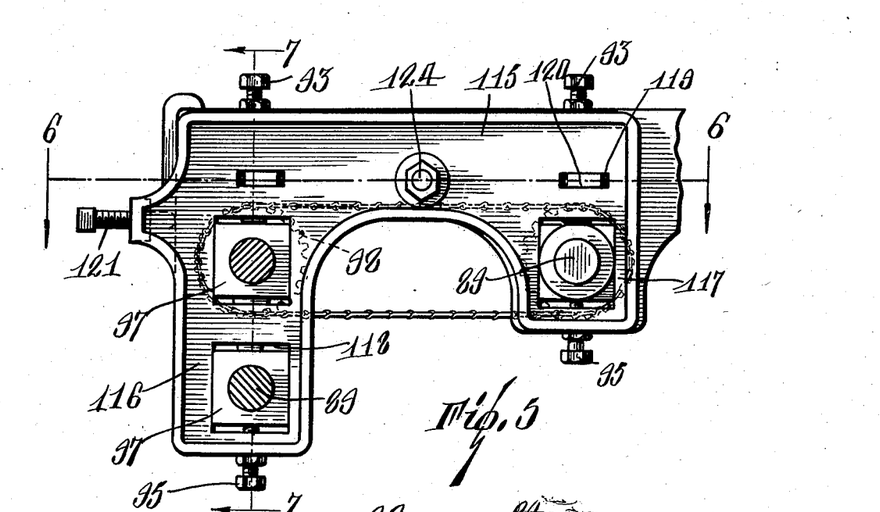
Figure 5 is an enlarged elevational view illustrating the construction of the roller arbor adjusting frame.

Slidably attached to the outer side of the rear frame standard and arranged for lateral adjustment thereof is a horizontal arbor shifting frame 115 adapted to be mounted on the standard in vertical position and including an upper horizontal body formed with a relatively long vertical extension 116 at one end and a shorter extension 117 at the opposite end, the extensions depending downwardly and provided with rectangular shaped openings 118 through which the arbor bearings 97 are extended. (See Fig. 7). The openings 118 are substantially longer in vertical extension than the bearings to permit adjustment of the bearings therein. The body portion of the frame 115 is formed with a pair of longitudinally elongated slots 119 arranged adjacent the upper edge of the frame and adapted to slidably receive therein elongated ribs 120 formed integrally with the outer side of the standard. With particular reference to Figure 5 it will be noted that the slots 119 are substantially longer than the ribs 120 so that the frame 115 can be adjusted horizontally on the standard. The lateral adjustment of the frame is effected by means of a set screw 121 threaded through an angular projection formed on the end of the frame and 122 adapted to contact with the vertical edge of the standard, so that rotary operation of the set screw will shift the frame 115 on the standard and produce a corresponding shifting movement to the rear arbor bearings so as to permit alinement of the feed roller arbors 89 with the horizontal extension of the saw arbors so that the lath bolt will be fed in accurate alinement with the saws. The arbor shifting frame 115 is also formed with an intermediate slot 123 through which is extended a bolt 124 projecting also through a registering opening in the standard whereby the frame 115 can be locked in adjusted position.

In connection with the foregoing structure it will be noted that means are provided for laterally adjusting the operative position of the movable saw arbor bearing 42, this being accomplished by means of a horizontal set screw 125 threadedly mounted at a right angular position with the bearing in a vertical ear 126 formed on the rear side of the auxiliary frame 34. It will thus be seen, that threaded operation of the set screw 125 will cause lateral shifting movement of the bearing 42 and base plate within the confines of the base plate recess formed on the auxiliary frame to enable accurate adjustment of the saw arbor 48 in position parallel with the arbor 64 to maintain the saw sets in alined positions.

The horizontal table 87 is detachably connected to a table support frame 127 embodying a flat vertical body plate formed with an upper horizontal flange 128 and an irregular bottom flange 129. The ends of the body plate are formed with vertical elongated slots 130 engageable with set screws 131 threadedly mounted in the front standard and projecting through the slots to secure the table support frame in proper adjusted position. The support frame is vertically adjusted by means of set screws 132 threaded through horizontal flanges formed at the lower end portions of the table frame contacting with horizontal outwardly projecting shelf plates 133 formed on the outer side of the main frame standard. By loosening the set screws 131 and actuating the vertical set screws 132 the table support frame may be vertically adjusted with respect to the saws to compensate for any variance in the diameter thereof. Detachably connected to the lower portion of the front standard and disposed below the saw openings in the table 87 is a downwardly inclined saw dust trough 134 adapted to convey the saw dust to a suitable receptacle or endless conveyor. Detachably secured on the table support frame 127 in a position adjacent the front standard, is an angular guide member 135 embodying an angular vertical flange against which the bolt to be sawed is urged by the angular position of the initial feed rollers. The guide also includes a horizontal bottom flange provided with a series of openings by means of which the guide member is bolted on the table frame.

In the application of the machine, the lath bolt is fed longitudinally on the table between the feed rollers and directed through the saws. In the present construction, the bolt successively engages an initial set of saws arranged so as to cut through the lower half of the bolt and upon further movement of the bolt a second set cut through the remaining portion to form a series of conventional laths. Due to the vertically offset position of the saws each cutting a portion of the lath bolt it will be apparent that saws of relatively small gauge may be employed thus reducing to a minimum the waste of material.

If, during the passage of the bolt through the machine it is desirable to extract the bolt due to some unforeseen development the upper feed rollers may be quickly disengaged by manually shifting the angular arm 108 longitudinally thereby elevating the front vertical movable bearing plate and the forward roller arbor bearings allowing a convenient removal of the bolt.

As indicated in the foregoing description, an auxiliary bearing support frame is supported upon flanges formed on the inner sides of the main frame standards, this frame being adapted for vertical as well as horizontal adjustment. The vertical adjustment is effected by a series of threaded screws connected for simultaneous movement and operable to elevate the auxiliary frame in a uniform horizontal position so as to compensate for the wear of the saws. Horizontal adjustment of the auxiliary bearing support frame is accomplished by means of set screws mounted in the flanges of the main frame standards extending horizontally and contacting with the sides of the frame whereby a predetermined movement of the frame may be effected for proper arrangement of the saws. The auxiliary frame provides a base for the saw arbor bearings, one pair of longitudinally alined bearings being solidly fixed on the auxiliary frame to support one of the saw arbors, while complementary parallel bearings are adjustably positioned on the frame to support a complementary adjustable saw arbor. The rear adjustable bearing is arranged for longitudinal as well as lateral adjustable movement on the auxiliary frame so that the position of the adjustable arbor may be varied to conform to that of the stationary arbor so that the saws may be accurately alined under all conditions.

In order that the lath bolt may be cut to provide a plurality of uniform as well as accurate laths the present machine also embodies a roller arbor adjusting frame which, in the present embodiment is mounted for transverse sliding movement in a vertical position upon the rear frame standard. This frame engages the rear bearings of a plurality of the feed roller arbors, namely, the first three rollers, to insure proper initial movement of the bolt. The arbor adjusting frame is adapted primarily for lateral adjustment of the feed roller bearings, so that the arbors of the rollers initially engaging the bolt may be arranged in proper positions with respect to the transverse extension of the frame to urge the bolt against the vertical flange of the guide member as it is longitudinally fed along the table. The importance of this structure will be recognized when the necessity of accurate alinement of the saws and feed rollers is considered, as it is essential to accurately feed the bolt through the saws to provide conventional laths of uniform formation.

From the foregoing description and the drawings it will be noted that the present construction presents a novel and improved type of lath machine arranged to accurately and economically cut the laths from a bolt and which is designed to permit proper adjustment of the saws and feed rollers in compensation for the actual working conditions and the wear of the constituent elements.

It is to be understood that the form of our invention herewith shown and described is to be taken as the preferred example of the same, and that various changes as to the shape, size and arrangement of parts may be resorted to without departing from the spirit of the invention or the scope of the subjoined claims.

Having thus described our invention, we claim:

1. In a lath machine including a vertical support frame, a plurality of rotatably supported saws mounted on the frame, a plurality of feed rollers arranged to feed the lumber through the saws and mounted on the forward ends of roller arbors, bearings adjustably mounted in the forward and rear portions of the frame to rotatably support the arbors, a plate mounted for vertical sliding movement on the forward portion of the frame engageable with the forward arbor bearings, a plurality of levers pivotally connected with the frame having cam members formed on their lower ends engageable with and adapted to elevate the said movable plate upon arcuate swinging movement of the levers, and an operating arm pivotally connected with the upper ends of the levers operable to simultaneously swing the levers and elevate the plate and front arbor bearings.

2. In a lath machine including a vertical support frame, a plurality of cutting saws mounted in vertical position rotatably supported in the frame, a plurality of rollers arranged to feed a lath bolt through the saws fixed on horizontal arbors, a plurality of bearings rotatably supporting the forward ends of the arbors mounted in the forward end of the frame, a plurality of bearings supporting the rear ends of the arbors mounted for lateral movement in the rear end of the frame, a vertical bearing adjusting frame mounted for lateral sliding movement on the rear end of the frame and engageable with the rear bearings, and means for laterally adjusting the said vertical frame in predetermined position on the support frame.

3. In a lath machine including a plurality of feed rollers fixed on horizontal roller arbors, forward and rear bearings adapted to rotatably support the arbors on the machine, the said rear bearings being mounted for lateral movement on the machine, an angular frame mounted for sliding movement on the machine and connected with the rear arbor bearings, and means for laterally adjusting the said angular frame to horizontally adjust the position of the arbors.

In witness whereof we have hereunto set our hands.

OMERIL TARDIF.
LUCIEN CARRIER.